United States Patent [19]
Lee et al.

[11] Patent Number: 5,874,824
[45] Date of Patent: Feb. 23, 1999

[54] METHOD OF ACTIVATION TREATMENT OF NI/MH SECONDARY BATTERY BY HOT-CHARGING

[75] Inventors: Jai-Young Lee; Dong-Myung Kim; Ki-Young Lee; Jae-Han Jung, all of Taejon; Ji-Sang Yu; Han-Ho Lee, both of Seoul, all of Rep. of Korea

[73] Assignee: Korea Advanced Institute of Science and Technology, Taejon, Rep. of Korea

[21] Appl. No.: 819,122

[22] Filed: Mar. 17, 1997

[30] Foreign Application Priority Data

Mar. 15, 1996 [KR] Rep. of Korea ............... 1996-7021

[51] Int. Cl.$^6$ ........................................... H02J 7/00
[52] U.S. Cl. ................................. 320/130; 320/131
[58] Field of Search ............... 320/100, 124, 320/130, 131, 155, 160, DIG. 16, 103, 104, 120

[56] References Cited

U.S. PATENT DOCUMENTS

| | | | |
|---|---|---|---|
| 5,429,888 | 7/1995 | Hall | 429/50 |
| 5,536,591 | 7/1996 | Fetcenko et al. | 429/59 |
| 5,558,950 | 9/1996 | Ovshinsky et al. | 429/101 |
| 5,637,423 | 6/1997 | Ovshinsky et al. | 429/223 |
| 5,645,953 | 7/1997 | Kim et al. | 429/48 |
| 5,698,963 | 12/1997 | Seong et al. | 320/145 |

OTHER PUBLICATIONS

H. Sawa, et al., Effects of Oxidation Treatment of Ti–Zr–Ni Hydride Electrodes Containing Zr Ni Phase on Their Electrochemical Properties, the International Symposium on Metal–Hydrogen Systems, Fundamentals and Application, Stuttgart, FRG, Sep. 4–9:1527–1537 (1988).

S. Wakao, et al., Effects of Partial Substitution and Anodic Oxidation Treatment of Zr–V–Ni Alloys on Electrochemical Properties, J. Less–Common Treatment of Zr–V–Ni Alloys on Electrochemical Properties, J. Less–Common Met., 172–174: 1219–1226 (1991).

S. –R. Kim and J. –Y. Lee, Activation Behavior of ZrCrNiM Metal Hydride Electrodes(M=La, Mm(misch metal) Nd), Journal of Alloys and Compounds, 185:L1–L4 (1992).

*Primary Examiner*—Edward H. Tso
*Attorney, Agent, or Firm*—Knobbe, Martens, Olson & Bear, LLP

[57] ABSTRACT

The present invention provides a method of activation treatment of a Ni/MH secondary battery which comprises a step of immersing an electrode or battery in a solution or electrolyte and charging/discharging concurrently. In accordance with the activation treatment of a Ni/MH secondary battery by hot-charging method of the invention, the time required for activation treatment is remarkably saved and the activation process is carried out in a highly efficient manner, compared to the conventional methods of activation treatment.

10 Claims, 2 Drawing Sheets

METHOD OF ACTIVATION TREATMENT OF NI/MH SECONDARY BATTERY BY HOT-CHARGING

FIELD OF THE INVENTION

The present invention relates to a novel method of activation treatment of a Ni/MH (nickel-metal hydride) secondary battery, more specifically, to a method of activation treatment of a Ni/MH secondary battery which comprises a step of immersing an electrode or battery in a solution or electrolyte and charging/discharging concurrently.

BACKGROUND OF THE INVENTION

In general, a rechargeable Ni/MH secondary battery consists of a MH anode, 6M KOH electrolyte and a Ni(OH)$_2$ cathode, and the activation of a Ni-MH secondary battery depends on a MH anode, since the activation of a cathode is performed more easily than that of an anode in the Ni/MH secondary battery. When metal hydride(MH) alloy constituting an anode is exposed to the air, oxidized membrane is formed on the surface of the MH alloy, which results in no absorption of hydrogen during hydrogenation reaction. A process for treating the hydrogen-absorbing alloy in such a condition to absorb and release hydrogen easily is called "activation treatment". The method of activation treatment employed depends on the kind of MH, and the ease of the activation treatment is also dependent on the same.

An alloy of AB$_2$ type-Laves phase(A: an element having high affinity for hydrogen, B: transition metal), has a hydrogen-absorbing capacity higher than commercially available alloys of AB$_5$ type and has a long life span in an electrolyte, which allows the alloy to attract attention as a material for an anode employed in Ni/MH secondary battery. However, its activation during the construction process of an electrode is so difficult that it cannot be practically applied in the industry.

On the other hand, in order to improve the activation characteristics of the hydrogen-absorbing alloy of AB$_2$ type, a variety of studies on the design and surface treatment of the alloy have been carried out in the art:

Concerning the method of adding/replacing elements during the preparation of an alloy, Kim et al. reported that the addition of small amounts of rare-earth elements (La, Mm, Nd) to a ZrCrNi alloy results in reducing the number of charge/discharge cycle from 20 cycles to 5 cycles or less (see: Kim, S. R. et al., J. Alloys Comp., 185:L1(1992)), and Sawa et al. reported that the substitution of Zr with Ti in a Zr—Ni alloy system leads to improved activation characteristics (see: Sawa, H. et al., Zeit. fur Phys. Chem., 164:1527(1989)).

Concerning the method of surface treatment after the preparation of an electrode, Wakao et al. reported that the immersion of an electrode made of a Zr—V—Ni alloy in a KOH solution leads to efficient activation of alloy in a manner that the activation can be performed within about 5 cycles, and more efficient activation can be realized under a condition of long immersion time, high immersion temperature and anodic oxidation treatment(see: Wakao H. et al., "Int. Symp. on Metal Hydrogen Systems", September, 1990). Also, Lee et al. reported that the immersion of a ZrCr$_{0.8}$Ni$_{1.2}$ alloy in a solution containing NaBH$_4$ leads to a remarkably efficient activation within 2–3 cycles in half cell grounded on the hydrogen absorption by chemical reaction and surface change as well, and the immersion in a HF+HNO$_3$ solution or in a KOH solution complete the activation within 10 cycles (see: J. H. Lee, Ph.D. Thesis, KAIST(1993)).

On the other hand, the previous studies on the improvement of electrode activation characteristics by immersing an electrode in KOH, HF+H$_2$O$_2$ and NaBH$_4$, etc., have revealed that the activation process is realized by following two steps: first, an electrode is immersed in an immersion solution for a while; secondly, charge/discharge cycling is carried out in an electrolyte after the immersion.

SUMMARY OF THE INVENTION

The present inventors have made an effort to improve the conventional methods of surface treatment in a manner saving the time required for the immersion and accelerature of the activation process, and developed a highly efficient method of activation treatment of Ni/MH secondary battery by carrying out the two steps of immersing and charging/discharging in a simultaneous manner. This process is named "hot-charging" in the present invention.

A primary object of the present invention is, therefore, to provide a method of activation treatment of a Ni/MH secondary battery which comprises a step of immersing an electrode or battery in a solution or electrolyte and charging/discharging concurrently.

BRIEF DESCRIPTION OF DRAWINGS

The above and the other objects and features of the present invention will become apparent from the following description given in conjunction with the accompanying drawings, in which.

DETAILED DESCRIPTION OF THE INVENTION

Figure 1:
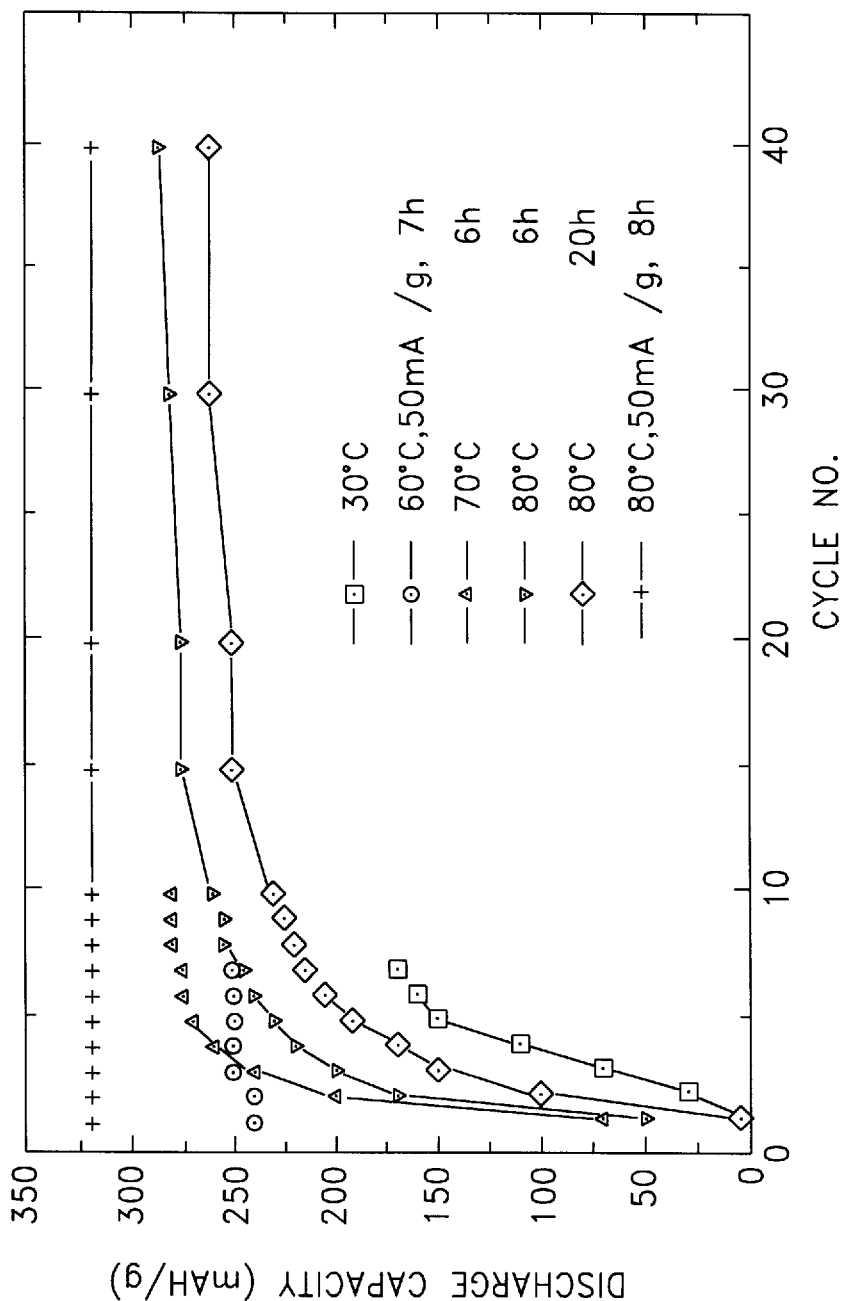
FIG. 1 is a graph showing activation behavior of Zr$_{0.7}$Ti$_{0.3}$Cr$_{0.3}$Mn$_{0.3}$V$_{0.4}$Ni$_{1.0}$ alloy treated by the hot-charging method of the invention and the conventional activation method.

In accordance with the present invention, a cell of a Ni/MH secondary battery is first consitituted by employing a MH alloy of Zr$_{0.7}$Ti$_{0.3}$Cr$_{0.3}$Mn$_{0.3}$V$_{0.4}$Ni$_{1.0}$, as a working electrode, a pt wire as a counter electrode and a Hg/HgO electrode as a reference electrode, and a KOH electrolyte. Then, it is heated on a hot plate at a temperature range of 60° to 100° C., more preferably 70° to 90° C., most preferably 80° C., and charged/discharged under a condition of a constant current density of 5 to 200 mA/g, preferably 20 to 150 mA/g, more preferably 30 to 100 mA/g, most preferably 50 mA/g, for 1 to 12 hours, preferably 3 to 10 hours, more preferably 5 to 10 hours, most preferably 8 hours, while immersing the electrode in a KOH electrolyte. In describing the present invention, "hot-charging method" is employed to mean the method of activation treatment illustrated as aboves. The hot-charging method has advantages that time required for activation treatment is remarkably saved and activation efficiency is very high, compared to the conventional activation treatment methods.

The present invention is further illustrated by the following examples, which should not be taken to limit the scope of the invention.

EXAMPLE 1

Activation behavior of a Zr$_{0.7}$Ti$_{0.3}$Cr$_{0.3}$Mn$_{0.3}$V$_{0.4}$Ni$_{1.0}$ alloy, a hydrogen-absorbing alloy of AB$_2$ type which shows high theoretical capacity and poor activation characteristics, was investigated by varying temperature of a KOH electrolyte, immersion time and charge current density, in accordance with a hot-charging method and a conventional activation treatment method. Then, the results were shown in a graph of FIG. 1. In FIG. 1, (—□—) represents an activation curve obtained by charging/discharging in a constant current at 30° C.; (—◉—) represents an activation curve obtained by hot-charging in a current density of 50 mA/g for 7 hours at 60° C.; (—△—) represents an activation curve obtained by immersing an electrode in a KOH electrolyte for 6 hours at 70° C.; (—▽—) represents an activation curve obtained by immersing an electrode in a KOH electrolyte for 6 hours at 80° C.; (—◇—) represents an activation curve obtained by immersing an electrode in a KOH electrolyte for 20 hours at 80° C.; and, (—+—) represents an activation curve obtained by hot-charging in a current density of 50 mA/g for 8 hours at 80° C. As shown in FIG. 1, activation characteristics were improved when an electrode was immersed, while immersion of the electrode for a long time at a high temperature provided poor results. Particularly, the experiments at 60° C. and 80° C. led to a conclusion that charging under an immersed state is critical for improving an activation character. That is, activation was accomplished in one cycle, when charging was carried out under conditions of a current density of 50 mA/g for 7 hours at 60° C., and a current density of 50 mA/g for 8 hours at 80° C., while much higher discharge capacity was obtained under the former condition.

EXAMPLE 2

Figure 2:
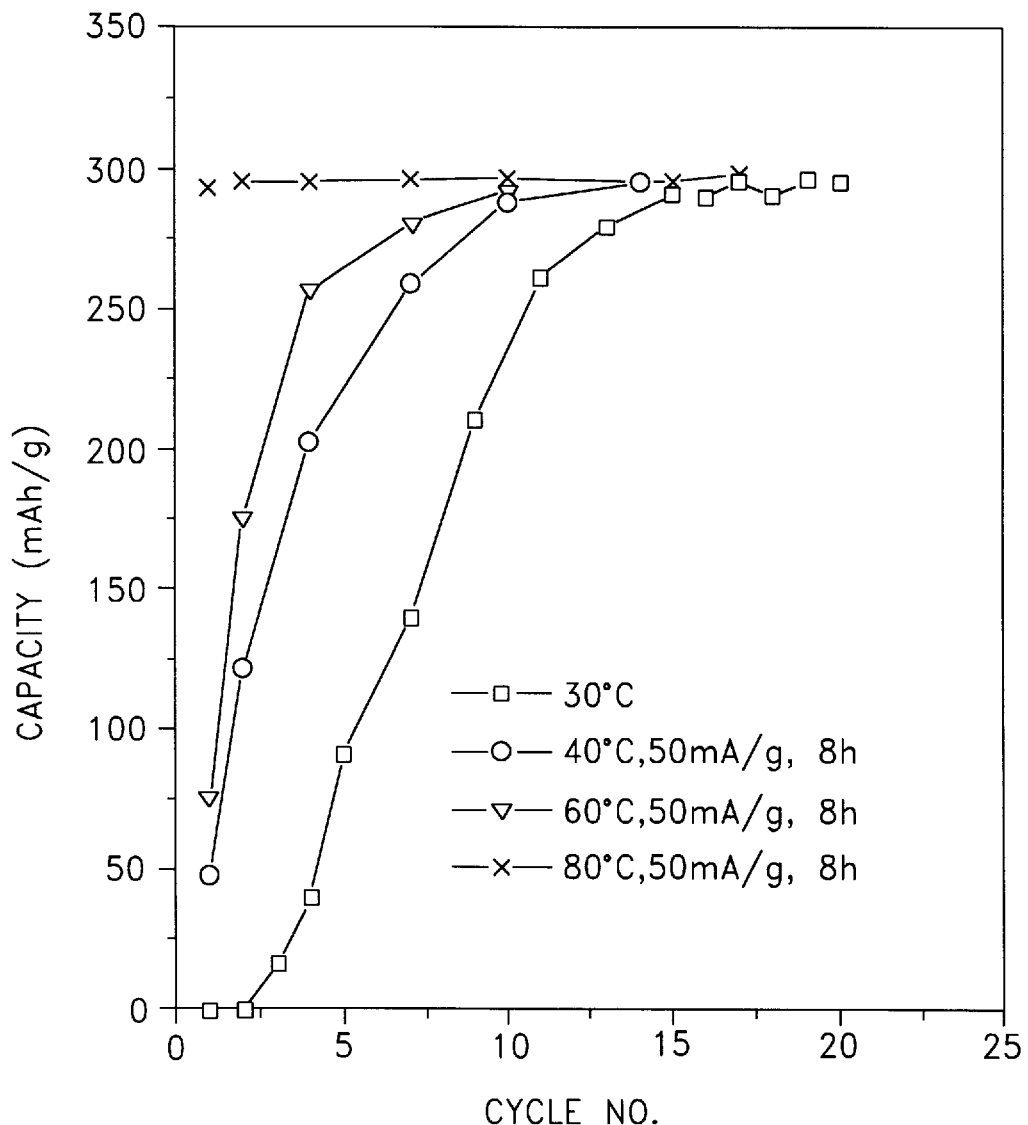
FIG. 2 is a graph showing activation behavior of a ZrCrNi alloy after hot-charging at the temperatures of 40° C., 60° C. and 80° C.

Activation behavior of a ZrCrNi alloy whose activation has been known to be very difficult, was investigated by varying the immersion temperature at at a range of 30° C. to 80° C. As a result, it was found that the most excellent activation characteristics were obtained at a temperature of 80° C. and concurrent charging/discharging under an immersed state, on the whole, provided good activation characteristics of electrodes (see: FIG. 2). In FIG. 2, (—■—) represents an activation curve obtained by charging/discharging in a constant current at 30° C.; (—○—) represents an activation curve obtained after hot-charging in a constant current of 50 mA/g for 8 hours at 40° C.; (—▼—) represents an activation curve obtained after hot-charging in a constant current of 50 mA/g for 8 hours at 60° C.; and, (—x—) represents an activation curve obtained after hot-charging in a constant current of 50 mA/g for 8 hours at 80° C. As shown in FIG. 2, it was revealed that samples prepared by hot-charging show excellent activation characteristics.

As clearly illustrated and demonstrated above, the present invention provides a method of activation treatment of a Ni/MH secondary battery which comprises a step of immersing an electrode or battery in a solution or electrolyte and charging/discharging concurrently. In accordance with the activation treatment of a Ni/MH secondary battery by hot-charging method, the time required for activation treatment is remarkably saved and the activation process is carried out in a highly efficient manner, compared to the conventional methods of activation treatment.

What is claimed is:

1. A method for activating electrodes of Ni/MH secondary battery, comprising immersing an electrode in an aqueous alkaline electrolyte and charging/discharging the electrode, wherein the immersing and the charging/discharging the electrode are performed simultaneously.

2. A method as defined in claim 1, wherein the immersing and charging/discharging the electrode are performed while the alkaline electrolyte is heated.

3. A method as defined in claim 2, wherein the electrolyte is heated to a temperature of 60° to 100° C.

4. A method as defined in claim 3, wherein the electrolyte is heated to a temperature of 70° to 90° C.

5. A method as defined in claim 1, wherein the charging/discharging is performed at a constant current density of 5 to 200 mA/g.

6. A method as defined in claim 1, wherein the charging/discharging is performed for 1 to 12 hours.

7. A method as defined in claim 1, wherein the aqueous alkaline electrolyte is KOH solution.

8. A method as defined as defined in claim 1, wherein the electrode is made of an $AB_s$ type alloy.

9. A method as defined as defined in claim 8, wherein the $AB_s$ type alloy is a ZrTiCrMnVNi alloy.

10. A method as defined as defined in claim 8, wherein the alloy is $Zr_{0.7}Ti_{0.3}Cr_{0.3}Mn_{0.3}V_{0.4}Ni_{1.0}$.

* * * * *